United States Patent
Schulte-Kellinghaus

(10) Patent No.: US 6,510,322 B1
(45) Date of Patent: Jan. 21, 2003

(54) TEMPORARY WIRELESS LOCAL-LOOP IN CELLULAR MOBILE NETWORKS

(75) Inventor: Hermann Schulte-Kellinghaus, Gladbeck (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/338,029

(22) Filed: Jun. 22, 1999

(30) Foreign Application Priority Data

Jun. 23, 1998 (DE) .......................... 198 27 939

(51) Int. Cl.[7] ................................. A04Q 7/20
(52) U.S. Cl. ...................... 455/450; 455/432; 455/509; 455/560
(58) Field of Search ................ 455/450, 451, 455/452, 453, 455, 456, 461, 527, 512, 513, 516, 560, 432, 433, 434, 435, 509, 436, 439; 370/322, 329, 330, 341, 348

(56) References Cited

U.S. PATENT DOCUMENTS

| | | | |
|---|---|---|---|
| 5,301,356 A | * 4/1994 | Bodin et al. ............... | 455/436 |
| 5,530,912 A | * 6/1996 | Agrawal et al. ............ | 455/450 |
| 5,574,977 A | 11/1996 | Joseph et al. .............. | 455/58.1 |
| 5,752,185 A | * 5/1998 | Ahuja ....................... | 455/414 |
| 5,862,485 A | * 1/1999 | Linneweh et al. .......... | 455/450 |
| 5,884,174 A | * 3/1999 | Nagarajan et al. ......... | 455/436 |
| 6,188,905 B1 | * 2/2001 | Rudrapatna et al. ....... | 455/452 |

FOREIGN PATENT DOCUMENTS

| | | |
|---|---|---|
| GB | 2 281 676 A | 3/1995 |
| JP | 04348626 A | 12/1992 |
| WO | WO 95/03679 | 2/1995 |
| WO | WO 96/31015 | 10/1996 |
| WO | PCT/EP99/04219 | 11/1999 |

OTHER PUBLICATIONS

Patent Abstracts of Japan, vol. 015, No. 009 (E–1021), Jan. 9, 1991, Nippon Telegr & Teleph Corp, "Reserved Connection System in Mobile Communication".

* cited by examiner

*Primary Examiner*—Edward F. Urban
*Assistant Examiner*—Temica M. Davis
(74) *Attorney, Agent, or Firm*—Jenkens & Gilchrist, P.C.

(57) ABSTRACT

To achieve an increased access to subscribers in a mobile cellular network with a plurality of service areas each covered by a related switching center, in each such switching center (10) there is provided an interface means (12) to establish a plurality of communication channels between the switching center (10) and a mobile station (MS) roaming in the service area of switching center (10). Further, the communication channel assignment at the interface (12) is changed through an assignment means (14) processing assignment requests submitted thereto. Further, reservation requests are used to indicate to the switching center (10) that a specific subscriber wants to reserve communication channel capacity for a specific cell in a mobile cellular network during a specific time period according to a specific bandwidth. If this bandwidth is available at the specified cell during the specified period of time, it will be reserved for the requesting subscriber which then may easily initiate calls-services or receive calls-services by the reserved communication channel capacity at the start time ($t_s$) of the prespecified period of time.

20 Claims, 12 Drawing Sheets

*FIG.5*
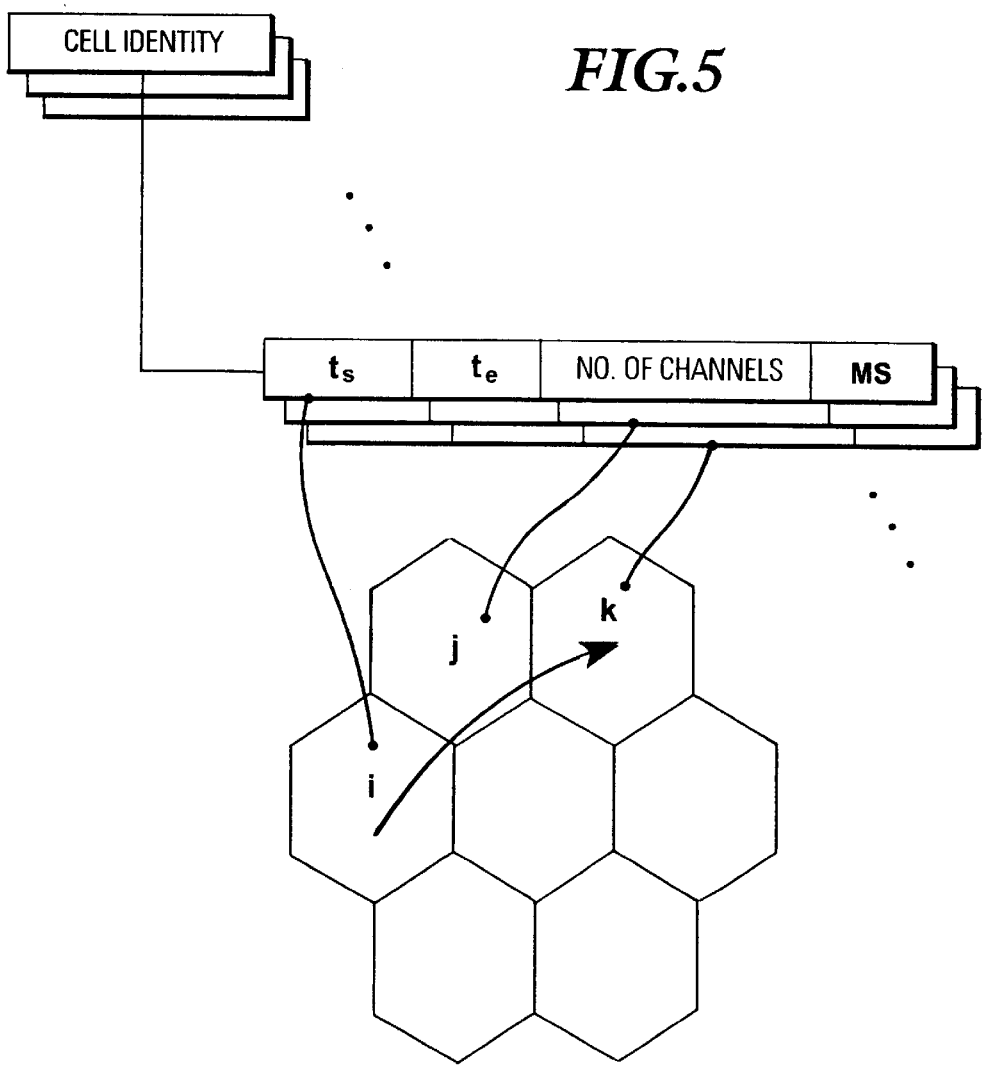
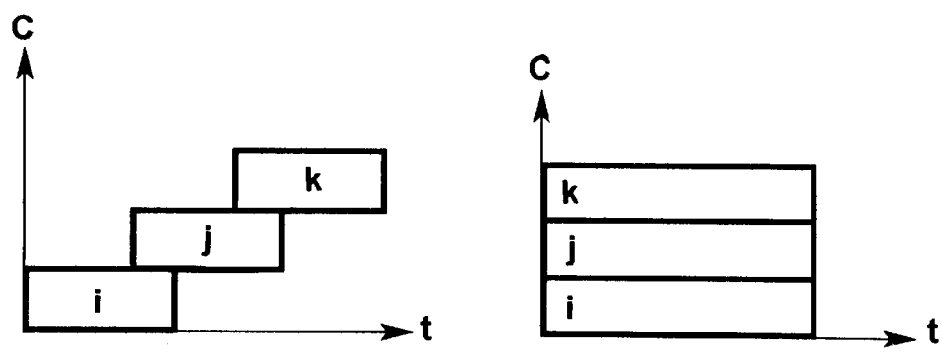

TEMPORARY WIRELESS LOCAL-LOOP IN CELLULAR MOBILE NETWORKS

TECHNICAL FIELD

The present invention relates to a switching center for a mobile cellular network and a method for the operation thereof, in particular the present invention relates to a switching center for a mobile cellular network enabling temporary wireless local loops in cellular mobile networks.

BACKGROUND ART

Basic sub-systems for the architecture of cellular mobile networks shown in FIG. 12 are a base station sub-system BSS, a switching center SC, a home location register HLR, and a visitor location register VLR, respectively. Neither the base station sub-system BSS nor the switching center SC are in direct contact with external networks, e.g., a public switched telephone network PSTN, and integrated services digital network ISDN, and a public land mobile network PLMN, e.g., a global system for a mobile communications GSM, a digital cellular network at 1,800 MHz DSC 1,800 or a personal communication system PCS. To link these networks, there is provided a gateway service switching center or switch that serves to determine specific locations of a mobile station MS in the cellular mobile network and to route calls towards this mobile station MS.

To this end, the switch is connected to a functional unit called home location register HLR storing subscriber information and mobile information to allow incoming calls to be routed to a mobile station MS. Thus, any administrative action through the network operator with respect to mobile station data is carried out in the home location register HLR.

To route a call to the mobile station MS, the switch, e.g. the GMSC in the GSM network, is also connected to a switching center SC through which the mobile station MS finally obtains a service. The switching center performs the necessary switching functions required for mobile stations MS covered thereby. Further, the switching center SC monitors the mobility of its mobile stations MS and manages necessary resources to handle and update the location registration procedures.

As shown in FIG. 12, the cellular mobile network comprises a plurality of switching centers SC covering a predetermined number of basic cells for an area wherein a mobile station MS may roam. Heretofore, each switching center SC is connected to a visitor location register VLR. This visitor location register VLR is a functional unit that dynamically stores mobile station information, e.g., location area in case the mobile station MS is located in the area covered by the visitor location register VLR. In case a roaming mobile station MS enters an area assigned to a specific switching center SC, the switching center SC informs the associated visitor location register VLR about the mobile station MS.

Further, the base station sub-system BSS corresponds to physical equipment providing radio coverage to prescribed geographical areas known as cells and shown as hexagonal geographical regions in FIG. 12. Each base station sub-system BSS contains equipment required to communicate with the mobile station MS. Functionally, a base station sub-system BSS provides a control function carried out by a base station controller BSC and a transmitting function performed by the base transmitter station BTS. Thus, the base transmitter system BTS corresponds to a radio transmission equipment and covers a single cell. To the contrary, the complete base station sub-system BSS serves several cells because it may comprise a plurality of base transmitter systems BTS.

Therefore, contrary to a fixed network such as the public switched telephone network PSTN, where the connection between the subscriber in the next network node called "local-loop" is fixed and rent by the subscriber to avoid the access of further subscribers thereto in mobile cellular networks the subscription does not include the connection to the closest network node, i.e. the next base station sub-system BSS.

Even more important, in cellular mobile networks, the bandwidth or equivalently the available communication capacity in one cell is limited. In case a mobile user needs access to communication capacity, e.g., for a call or a service at a specific time, it may not be guaranteed that this communication capacity is actually assigned to the subscriber. The reason for this is that during specific times there may exist congestion in the cell where the user is currently located. Further, due to the increasing number of subscribers to cellular mobile networks and to the significant increasing use services requiring ever more bandwidth than currently existing services, this situation may even arise more often in the future.

While one could think of using directly the priority handling provided for an existing cellular mobile networks such as GSM, this could lead to different treatment of subscribers therein which is clearly not desirable for the operators as well as the subscribers. One reason is that the use of priorities effective over the complete network at any time and any place will beyond doubt lead to problems, since, firstly, in case of congestions within overloaded cells everybody would simply increase his priority to get communication capacity and, secondly, with many high priority users there would exist too many subscribers to higher or even highest priority. In conclusion, in today's mobile cellular networks there exists no possibility for the subscribers to reserve communication capacity such that each subscriber has the same opportunity to carry out such a reservation and an overall continuous throughput in the mobile cellular network is nevertheless maintained.

SUMMARY OF THE INVENTION

In view of the above, the object of the invention is to achieve an increased subscriber accessibility in a mobile cellular network.

According to the present invention, this object is achieved through a switching center for mobile a mobile cellular network, comprising interface means adapted to establish at least one communication channel between said switching center and at least one mobile station roaming in at least one cell of said mobile cellular network, assignment means adapted to change a communication channel assignment at said interface means upon an assignment request, each assignment request specifying at least a target position and a communication capacity change, respectively, and communication capacity reservation means adapted to reserve a specific communication capacity to at least one target position during a prespecified period of time upon receipt of a reservation request.

Therefore, the inventive switching center enables the subscriber of the mobile cellular network to reserve communication capacity in a specific area and within a specific time frame. Typically, the subscriber initiates a request for a communication capacity using a message to the switching center, e.g., using USSD and SMS, respectively, wherein the communication capacity, one or more target positions for which the reservation is to be carried out and also the specific time frame is defined. Using this specific request information, the switching center blocks the requested communication capacity for other subscribers in case the communication capacity is available.

According to the preferred embodiment, the communication capacity reservation means comprises a data base means adapted to store at least the reserved communication channel capacity, the communication channel target positions, and the prespecified period of time for each reservation request. The provision of the data base means allows a very simple evaluation of each request submitted to the switching center, since requests previously submitted thereto can easily be checked on.

According to a further preferred embodiment of the present invention, the data base means also stores a priority value which is effective in the range of the target positions or in other words only in a small part of the mobile cellular network and which is a measure of probability that said assignment means is activated at the beginning of the prespecified period of time in accordance with the reservation request. This embodiment of the invention is particularly well adapted to situations where a plurality of requests for communication capacity are submitted to the switching center, each of which may not be acknowledged due to already existing reservations. Using priority values, the service provider has the opportunity to give preference to important customers, if necessary.

According to a further preferred embodiment of the present invention, the communication capacity reservation means further comprises a request checking means adapted to check whether a submitted request can be acknowledged or not. This evaluation can be carried out using a plurality of criteria such as available communication capacity for a cell, a maximum acceptance time between submission of a request and acknowledgment thereof, and the authorization of a subscriber to submit such a request, respectively. The last case can be related to a roaming subscriber which, e.g., in accordance with existing subscription conditions may only reserve reservations in, e.g., his home public land mobile network.

According to a further preferred embodiment of the present invention, the switching center also comprises location mapping means adapted to map a geographical information specified in a request into the at least one target position. Therefore, according to the present invention, it is taken into account that the subscriber usually is not aware of the cell-ID of the cell where he is currently roaming but more or less only is thinking of, e.g., specific cities, areas, street names, and so forth. However, the inventive location mapping means enables the subscriber to specify the area for which he needs a communication capacity reservation in the more accessible terms of locations, e.g., the Aachen main station or a specific place of business, which may then be transformed cell-IDs through software processing a relationship between these location informations and the cell-IDs.

According to a further preferred embodiment, the location mapping means further processes routing information specified in a request. This embodiment reduces the burden on the subscriber to specify at which positions at what time he needs a communication capacity reservation. The subscriber simply specifies his route starting point and route ending point as well as his travelling speed and expected required communication capacity. From this, the location mapping means derives all positions along the specified route. Further, the start time and end time for each cell along the path are derivable from the start time for the first cell and the cruising speed of the subscriber. In addition, the current location may be derived during an ongoing call using, e.g., cell Ids or even exact positions. Furthermore, reservations in cells a subscriber has left may be released.

According to another aspect of the present invention, there is provided a method to reserve communication capacity between at least one switching center in a cellular mobile network and a mobile station roaming in at least one cell of said cellular mobile network, said method comprising the steps receiving a request for communication capacity between said switching center and said mobile station, deriving all cells covered by said switching center and being affected through said received request, determining a match between a communication capacity assignment profile and said requested communication capacity for all affected cells, and reserving a communication channel according to said requested communication capacity between said switching center and said mobile station at a start time prespecified in said request for communication capacity.

Therefore, the inventive method relies on the concept of a communication capacity assignment profile for each cell in a cellular mobile network specifying for each time the amount of communication capacity previously reserved. Using this approach, the admissibility of a further submitted request can be evaluated simply through a scan of all times where the communication capacity assignment profile of the cell changes.

Overall, the present invention provides a subscriber to a cellular mobile network with the possibility to rent needed communication capacity for a specific time frame. This is particularly useful in case where the mobile subscriber wants to be reachable within a specific time frame at a specific cell in accordance with a specific bandwidth. In another case, the subscriber may want to set up a connection with a specific communication capacity during a specific time frame and a specific cell. With the described functionality, the inventive cellular mobile network guarantees the communication capacity in the selected cell within the selected time frame in compliance with the mechanisms provided for in fixed networks.

DESCRIPTION OF DRAWING

In the following, preferred embodiments of the present invention will be described with reference to the enclosed drawing in which:

FIG. 5 shows the operation principles of the data base unit shown in FIG. 2;

DESCRIPTION OF PREFERRED EMBODIMENTS

Figure 1:
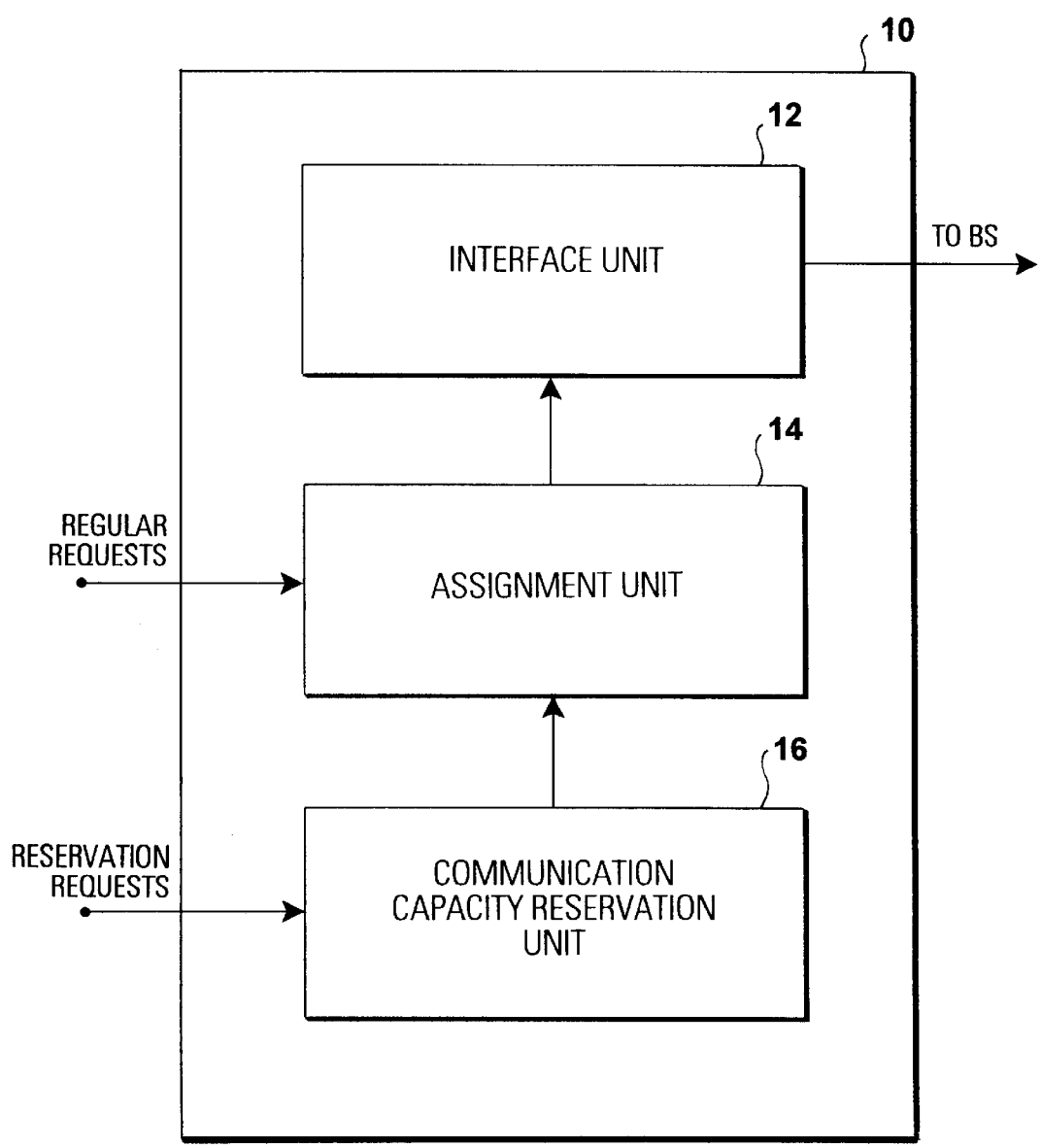
FIG. 1 shows a schematic diagram of the switching center according to one embodiment of the present invention.

As shown in FIG. 1, the switching center 10 for a mobile cellular network, e.g. the MSC in the GSM, according to the present invention comprises an interface unit 12, an assignment unit 14, and a communication capacity reservation unit 16, respectively. Without restricting the scope of the present invention, for the purpose of this description it is assumed that location information with respect to mobile stations is available in the switching center. The interface unit 12 serves to establish one or more communication channels between the switching center and related mobile stations roaming in the area that is covered by the switching center 10. Typically, the communication channels implemented through the interface unit 12 change over time as mobile stations roam into or out from the area covered by the switching center. Every time a request for such a change of the communication channels is submitted to the switching center, the assignment unit 14 changes the communication channel assignment at the interface unit 12. Typically, each request to change a communication channel assignment specifies at least a target cell and a communication capacity change to the target cell.

Further, the switching center 10 is provided with a communication capacity reservation unit 16 to reserve a specific communication capacity to at least one target cell during a prespecified period of time upon receipt of a reservation request. Immediately at the start time of the prespecified period of time, the communication capacity reservation unit 16 activates the assignment unit 14 in accordance with the reservation request.

Figure 2:
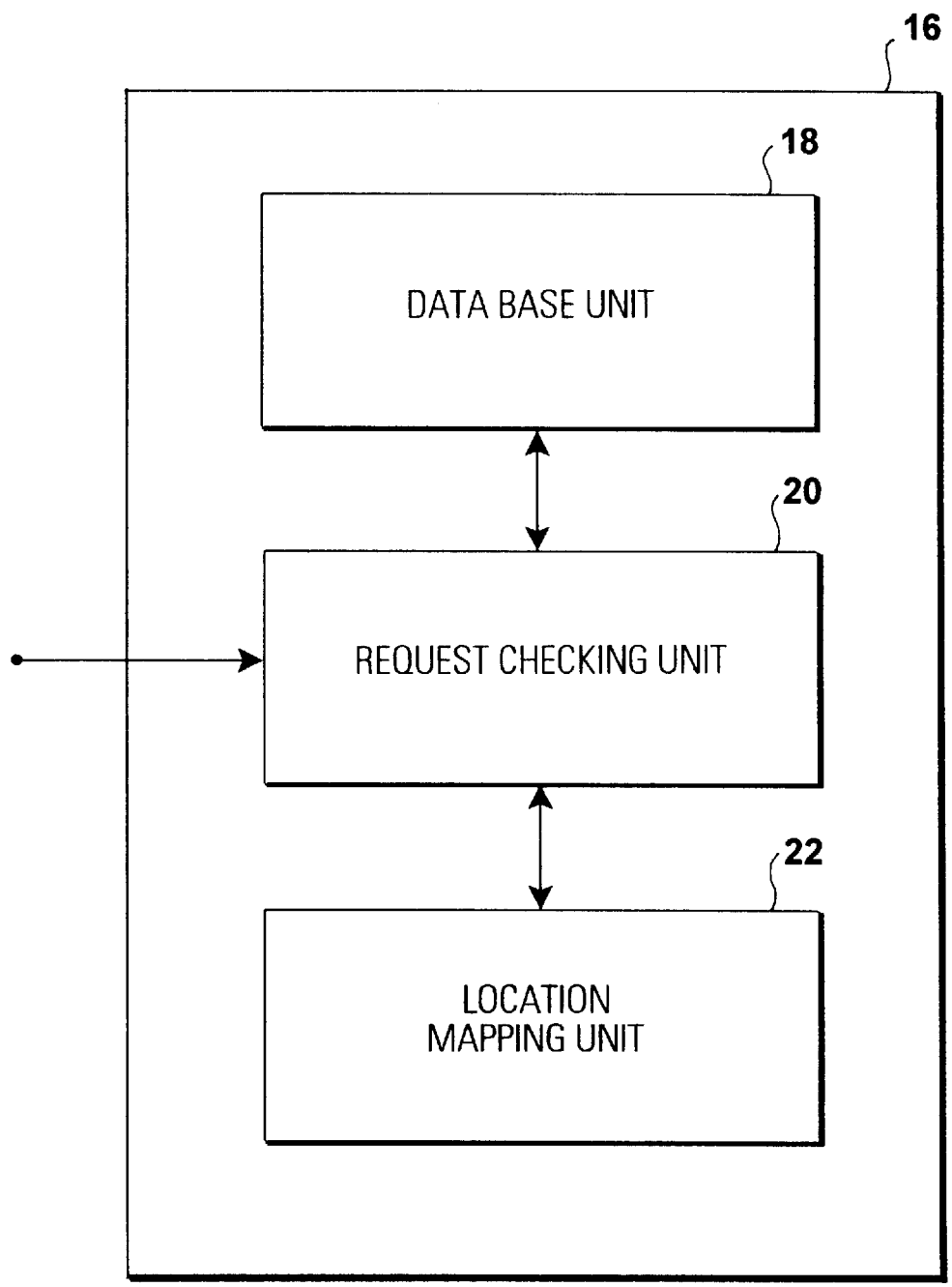
FIG. 2 shows a schematic diagram of the communication capacity reservation unit shown in FIG. 1.

As shown in FIG. 2, to implement this functionality, the communication capacity reservation unit 16 comprises a data base unit 18, a request checking unit 20, and a location mapping unit 22, respectively.

The data base unit 18 stores information about reserved communication channel capacity, related cells and prespecified periods of time at which the communication capacity is reserved. Preferably, the data base unit 18 also stores a priority value as measure of probability that the assignment unit 14 is activated at the beginning of the specified period of time in case of conflicting requests submitted to the switching center 10.

The request checking unit 20 shown in FIG. 2 is adapted to check the admissibility of a request submitted to the switching center 10. To this end, the request checking unit 20 scans all cells being affected by the submitted request and compares the requested communication capacity with the available communication capacity over the period of time specified in the request.

As is also shown in FIG. 2, the communication capacity reservation unit 16 also comprises a location mapping unit 22 to determine the target cells being affected by a request for communication capacity submitted to the switching center 10. This location mapping unit 22 is in particular activated in case the subscriber provides geographical information such as the name of a city or street, respectively, or zip code of a city and so forth, i.e. information which is readily available to the subscriber but not directly processed in the switching center 10.

Further, the location mapping unit 22 is also adapted to derive the at least one target cell from routing information specified in a request. This means that in response to the mobility demands specified by a subscriber, the communication capacity reservation unit 16 automatically derives all cells being affected through the request.

Following the basic structure of the inventive switching center for a mobile cellular network described above, a more detailed description of the functionality of the different components of the switching center will be given with respect to FIG. 3.

Figure 3:
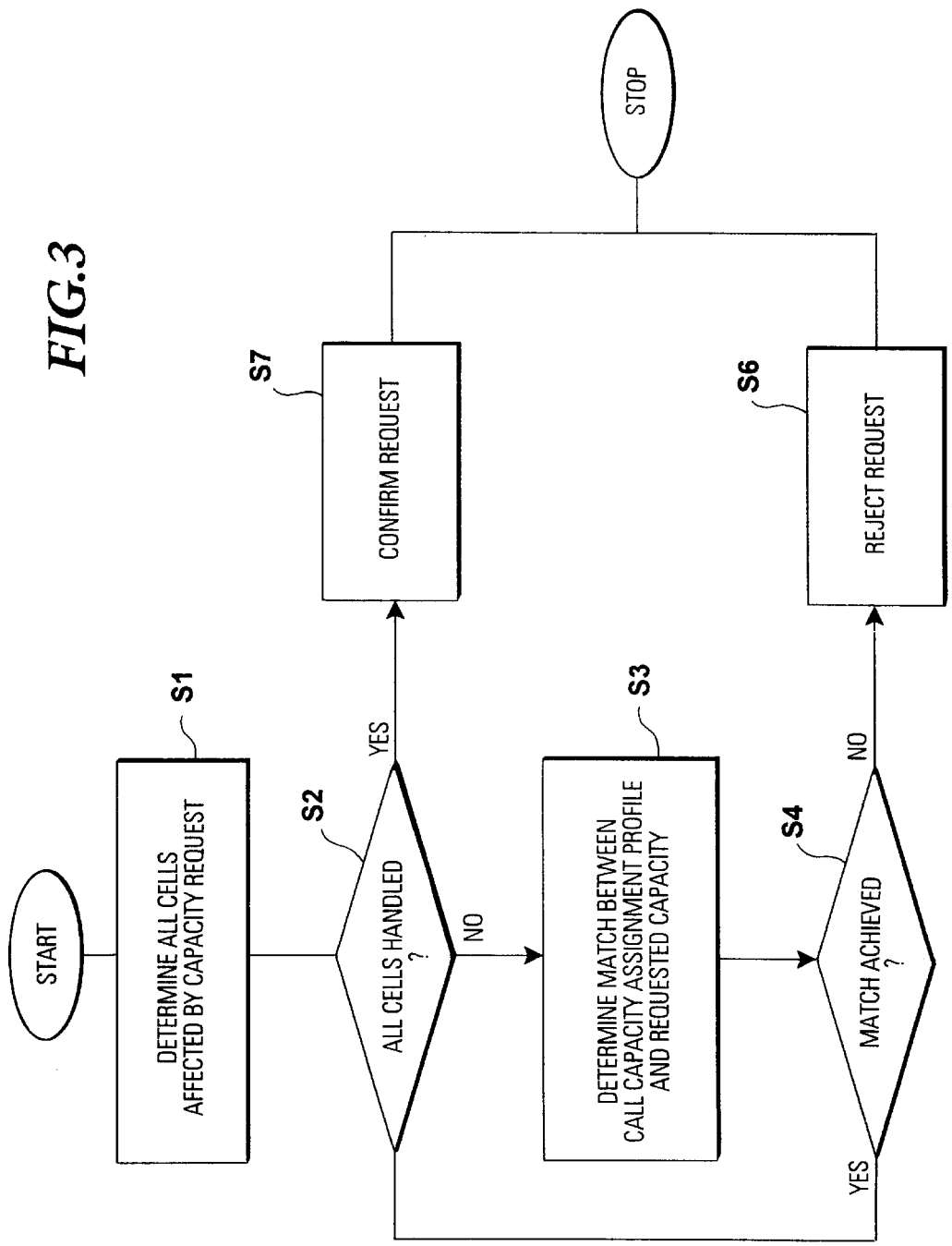
FIG. 3 shows a flowgraph according to the process for reserving communication capacity in a cellular mobile network.

FIG. 3 shows the basic outline of the method to reserve communication capacity between the switching center 10 of the mobile cellular network and the mobile station roaming therein.

As shown in FIG. 3 after the receipt of a request for communication capacity to be established between the switching center and the mobile station in step S1 there are derived all cells covered by the switching center 10 and simultaneously being affected through the received request for communication capacity. The interrogation step S2 serves to handle cells in which communication capacity is to be reserved in a step-by-step fashion.

Figure 4:
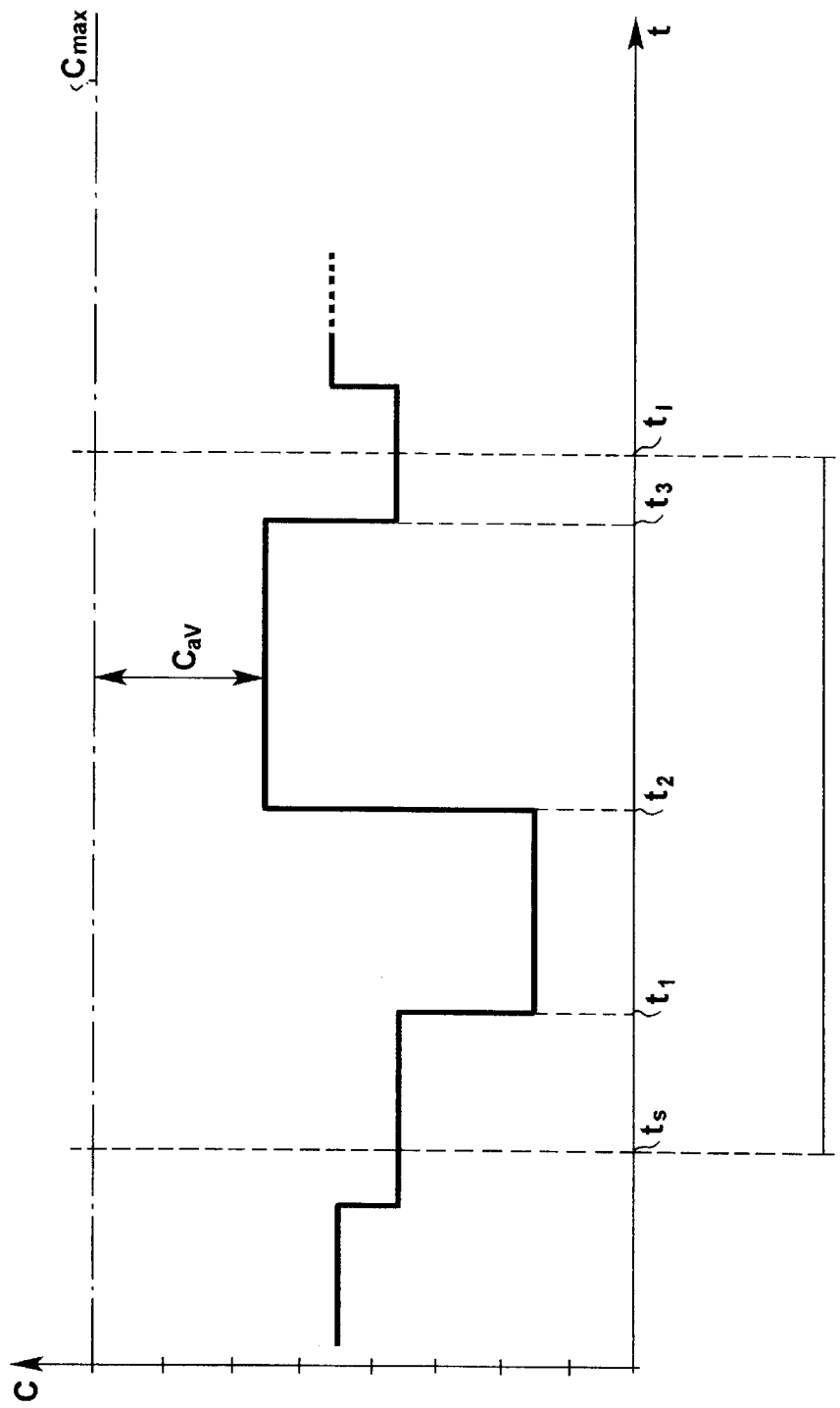
FIG. 4 shows the concept of a communication capacity assignment profile for a cell in the cellular mobile network underlying the different embodiments of the present invention.

As is also shown in FIG. 3, for each cell it is determined in step S3 whether a match between a cell capacity assignment profile and a requested communication capacity may be achieved. In other words, for each cell there is stored the previously reserved communication capacity and the change of this communication capacity over time, as shown in FIG. 4. Only if at every time between the start time and end time of the prespecified time period the amount of available communication capacity is larger or equal than the requested communication capacity, the interrogation in the succeeding step S4 is affirmative. Otherwise, the requested communication capacity may not be provided for and the request is to be rejected in step S6. However, if for all cells being affected through the capacity request, the interrogation in step S4 is affirmative, the interrogation step S2 branches off to the confirmation of the request in step S7.

FIG. 4 shows an example of the cell capacity assignment profile referred to above with respect to FIG. 3.

Each cell in the mobile cellular network provides a maximum communication capacity $C_{max}$, e.g., expressed as maximum number of communication channels being specified, e.g., to 16 within the GSM mobile cellular network. Further, besides the maximum available communication capacity $C_{max}$ in each cell, the actually used and assigned communication capacity C changes over the time.

With respect to the present invention, of particular interest is the change of assigned communication capacity within a time frame defined through the start time $t_s$ and the end time $t_e$ specified in a request. Typically, there exist several intermediate times $t_1$, $t_2$, $t_3$ between the start time $t_s$ and the end time $t_e$ where this capacity assignment changes. To determine whether a request is allowable from the viewpoint of available channel capacity, it is thus necessary to compare the requested communication capacity with the assigned communication capacity both at the start time $t_s$ and the end time $t_e$ as well as the intermediate times $t_1$, $t_2$, and $t_3$.

As shown in FIG. 4, the bottleneck with the illustrated capacity assignment profile lies between time $t_2$ and time $t_3$ and only in case the requested communication capacity is lower than $C_{av}$, the request will be confirmed according to said S7 shown in FIG. 3.

While the capacity assignment profile explained with respect to FIG. 4 is related to the question whether a request submitted to the inventive switching center 10 must be rejected or may be confirmed through the request checking unit 20 shown in FIG. 2, in the following a more detailed explanation of the further components of the communication capacity reservation unit 16 will be given, in particular of the data base unit 18.

FIG. 5 shows a typical sketch for a move of a mobile station through a mobile cellular network, e.g., the movement of a mobile station MS along the cells i, j, k, and so forth. As shown in FIG. 5, the data base unit 18 of the communication capacity reservation unit 16 carries an entry for each cell i, j, k along the movement path of the mobile station MS. Assuming—without restriction—that enough capacity is available at each cell, each entry identifies the cell identity, the start time $t_s$, the end time $t_e$, the number of reserved channels or equivalently the amount of reserved communication capacity, and the roaming mobile station MS, respectively.

Further, at the lower part of FIG. 5, two communication capacity reservation strategies are illustrated by way of example. With the example illustrated on the lower left side, it is assumed that the mobile station moves along the arrow running through cells i, j, k. Clearly, in such a case it is not necessary to reserve the necessary communication capacity during the complete time period when the mobile station MS is roaming from cell i to cell k. To the contrary, aiming at minimum communication capacity reservation times, one might assume a continuous move of the mobile station and thus only reserve the related communication capacity for each cell i, j, k when the mobile station is actually roaming therein. This may be achieved through permanent monitoring of the actual/current position and/or cell, respectively.

However, in other cases it may not be predictable at what time exactly the mobile station will reach each of the cells i, j, k so that it might be necessary to reserve the requested communication capacity during the complete period of time where the mobile station is roaming in the cellular mobile network as shown in the lower right part of FIG. 5.

It should be understood that any suitable strategy for reserving communication capacity may easily be implemented with the inventive communication capacity reservation unit 16 and the data base unit 18 comprised therein. In particular, the overlap time period between different intervals for each cell may easily be changed. Also, a mixed mode reservation strategy for a combination between the examples shown on the lower left and right sides of FIG. 5 as implemented may as well be achieved.

In the following, a more detailed explanation of the functionality of the location mapping unit 22 shown in FIG. 2 will be given with respect to FIG. 6.

Figure 6:
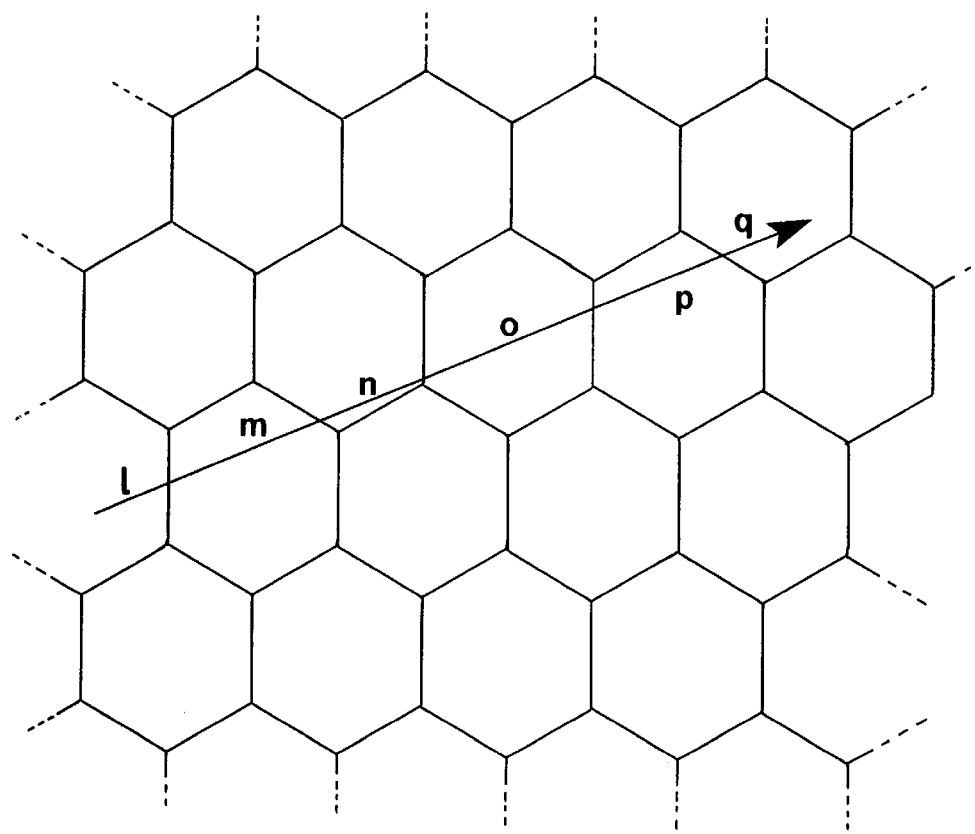
FIG. 6 shows the operation principles of the location mapping unit shown in FIG. 2.

FIG. 6 shows a roaming path for a mobile station MS running through cells l, m, n, o, p, and q, respectively. Thus, the simpliest way to implement the present invention would be to directly cite these cells in the communication capacity request submitted to the switching center 10.

However, in case of an extended roaming period for a mobile station MS in the mobile cellular network, this approach might be tedious and easily lead to errors. Therefore, the location mapping unit 22 provided for a communication capacity reservation unit 16 facilitates the submission of the request to the switching center 10, in particular for subscribers with high mobility.

A first approach is to only give the first cell l and the last q in the roaming path. Using this information, the location mapping unit 22 derives automatically information about the geographical locations of the different cells m, n, o between the start cell l and the target cell q.

Even more convenient for the subscriber, the location mapping unit 22 may also be adapted in a way where the subscriber must not give the cell identity l and q of the start and target cell, respectively, but may easily refer to geographical locations lying in these cells. Typical examples would be the name of a city, a street, a place of business, and airport, a main station, and so forth.

Another option would be that the subscriber specifies the starting point of his roaming path together with routing information, i.e. the direction of movement together with the speed of movement. In case this information is available, all cells lying along the roaming path and also the target cell can easily and automatically be derived therefrom. In this case, the frequency of reception of requests depends on the degree of insurance to get a communication capacity request accepted. Further, this concept described above may also be combined with a priority value concept enabling the service provider to provide superior service to important customers. Thus, in case of conflicting requests, the customer with high priority being stored, e.g., in the data base unit 18 shown in FIG. 2, would get his request confirmed through the request checking unit 20. Further, to avoid unused communication capacity reservations in case the forecast along a roaming path is done for a longer period of time and mobility demands change, the forecast period for which such reservations are carried out should not be too long.

While in the above the admissibility of a request and the roaming according to a request have been discussed with respect to the functionality of the request checking unit 20 and the location mapping unit 22 and FIGS. 5 and 6, respectively, in the following the timing aspect being related to the submission of requests will be discussed with respect to FIG. 7.

Figure 7:
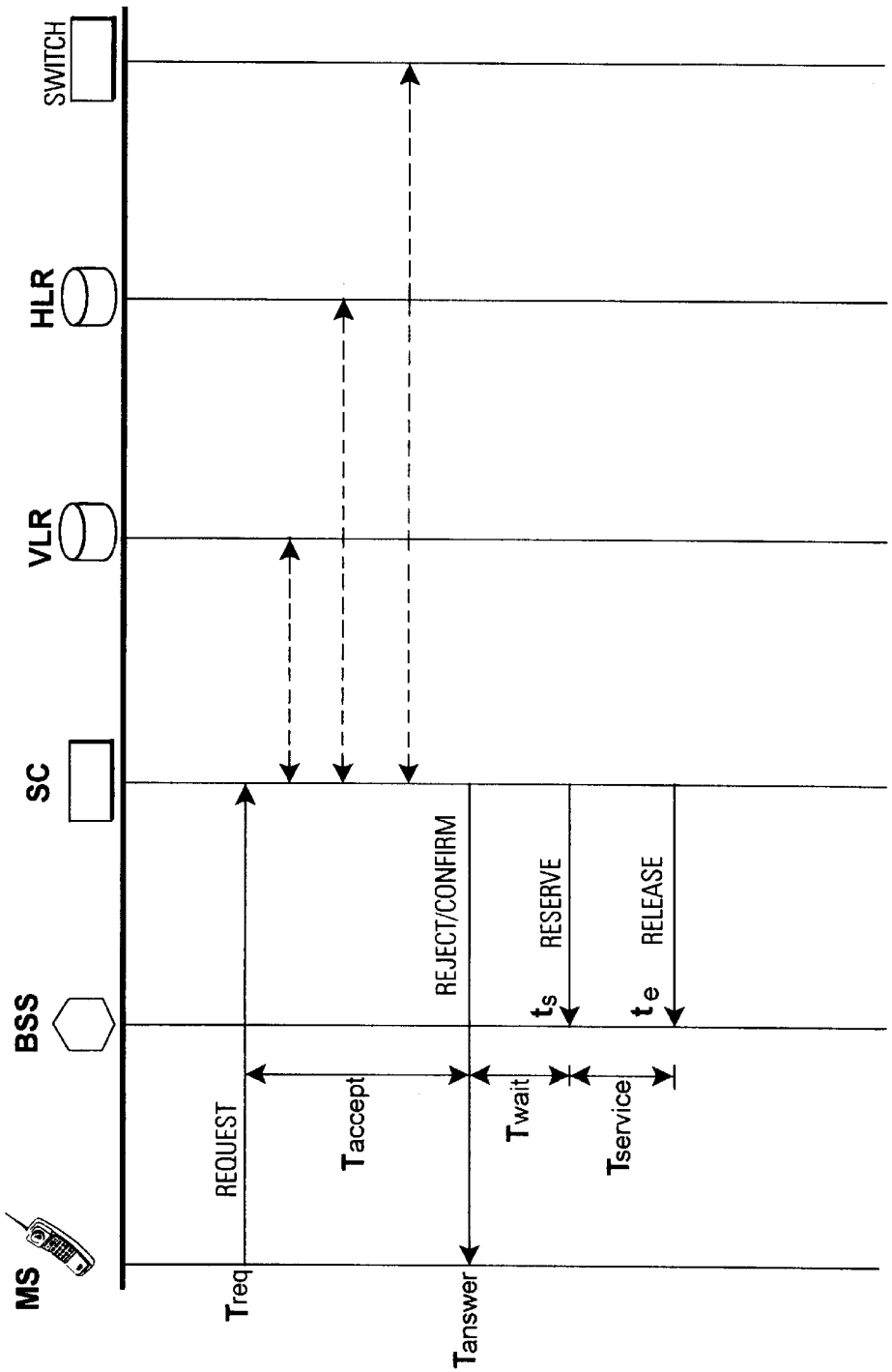
FIG. 7 shows timing requirements for the submission of a communication capacity request and the processing thereof.

As shown in FIG. 7, the subscriber submits a request for a communication bandwidth at a time $T_{request}$ and the switching center 10 either rejects or confirms this request at time $T_{answer}$. Thus, the time expiring between $T_{request}$ and $T_{answer}$ may be defined as $T_{accept}$. Further, in case the request is confirmed the requested communication capacity will be reserved for the prespecified time between the start time $t_s$ and the end time $t_e$, i.e. during a time $T_{service}$. In the following, the time between the expiration of time period $T_{accept}$ and the start of the time period $T_{service}$ will be referred to as $T_{wait}$.

As outlined above, the communication capacity will not be reserved in case it is not available in the cell wherein a subscriber is roaming during the requested time frame. In case the requested communication capacity is not available at the time $T_{request}$ the switching center must wait with the answer until the requested communication 10 capacity is either available before the start time $t_s$ or the requested time frame $T_{service}$ is reached.

Here, a possibility is to predefine a minimum waiting time $T_{wait,min}$ so as to provide sufficient time to process the answer in the switching center 10. Anyway, if the start time $t_s$ of the service period $T_{service}$ is reached, the switching center 10 must reject the request.

During the time period between the answer $T_{answer}$ and the start of the service period $T_{service}$, i.e. during $T_{wait}$ the switching center 10 informs other subscribers, e.g., through USSD, that communication capacity has been reserved and that eventually users may be disconnected at the start time ts of the service period $T_{service}$.

Further, during $T_{accept}$ the switching center 10 can first analyse the submitted request at least including the information reservation start time $t_s$, reservation end time $t_e$, requested communication capacity, and information about the area where communication capacity is to be reserved, as outlined above. In case one of this information may not be handled by the switching center 10 or is submitted in a false way, the request will be rejected and the user gets an applicable notification.

As shown in FIG. 7, optional steps may be carried out in the switching center 10, in particular in the data base unit 18 and the request checking unit 20 shown in FIG. 2.

One example would be that the switching center 10 blocks reservations and requests submitted by subscribers only being a visitors in the mobile cellular network the switching center is assigned to. This would easily be derivable through a data exchange between the switching center 10 and the visitor location register VLR.

Another option would be to give preference to subscribers of a specific user group, e.g., subscribers taking responsibility for security purposes or medical care, which information could easily be derived from a data exchange between the switching center 10 and the home location register HLR. This could, e.g., be achieved using existing GSM access classes as described in the GSM 02.11 Standard Version 5.0.1 and the GSM 04.08 standard Version 5.8.0.

Figure 8:
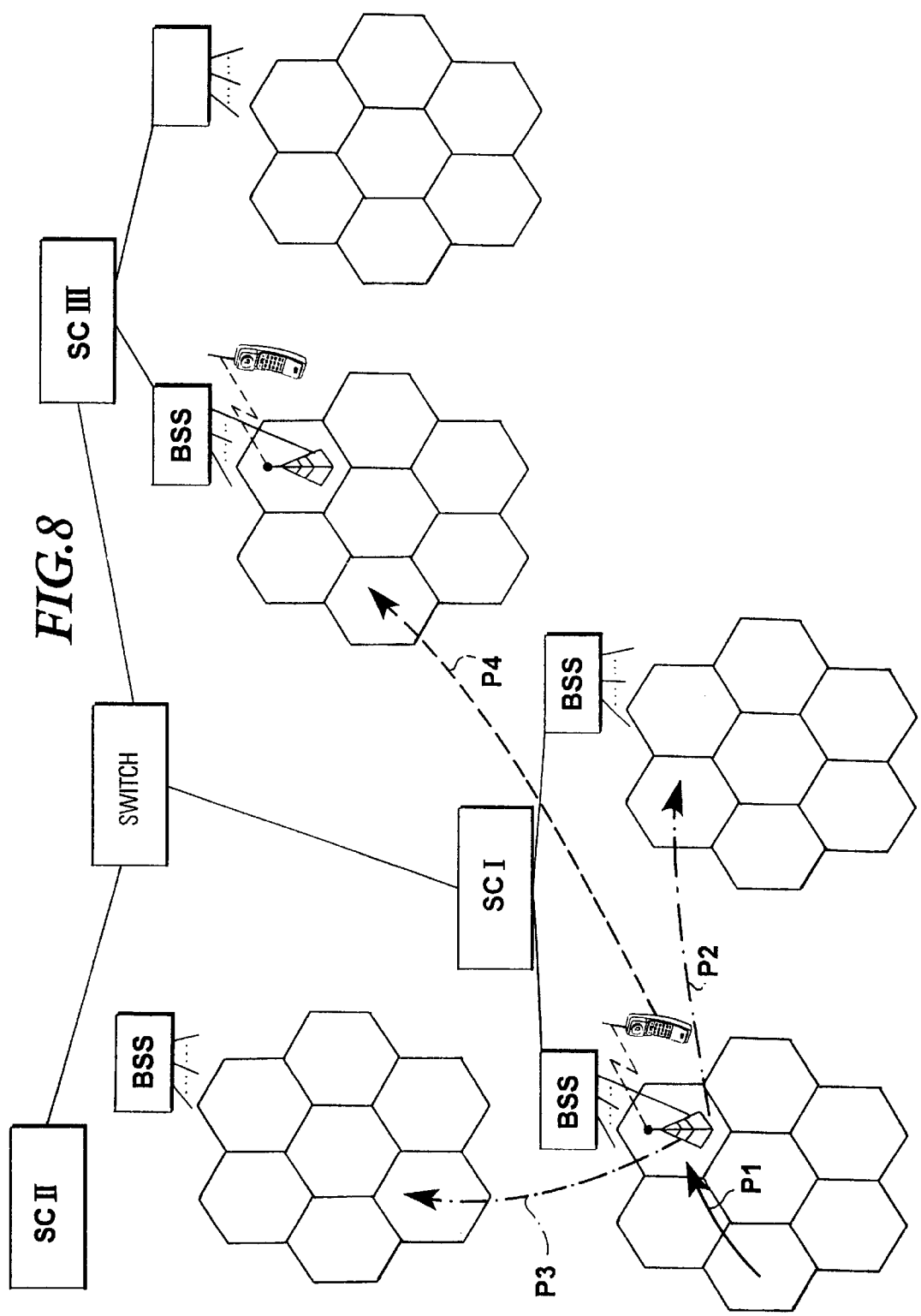
FIG. 8 shows different scenarios for the roaming of a mobile station in a mobile cellular network.

A further option is related to additional roaming scenarios shown in FIG. 8.

In particular, one can consider the roaming of a subscriber between geographical areas supported by different base station sub-systems BSS. Contrary to the case shown in FIG. 5, this would lead to a roaming path P2 shown in FIG. 8. Nevertheless, such a roaming path P2 can easily be handled through a single switching center SC I without any interaction to a switch.

As shown in FIG. 8, this is not true in case the subscriber roams between geographical areas covered by different switching centers SC I and SC II according to the roaming paths P3. Here, the switching center SC I receiving the request (also be referred to as anchor switching center SC I) must interact with a switch to contact the remote switching center SC II for processing of the communication capacity request. It this case the receiving of a request and the processing thereof is carried out through different switching centers in a mobile cellular network.

The same scenario applies in case the subscriber roams between a plurality of different mobile cellular networks covered through different switching centers SC I and SC III according to the roaming path P4 thus requiring interaction with at least one switch.

Referring again to FIG. 7, in case $T_{answer}$ is after $t_s$, $T_{wait}$ is 0 and procedures for $T_{service}$ are initiated immediately through the assignment unit 14 of the communication capacity reservation unit 16. Further, in case $T_{wait}$ is unequal 0, the communication capacity reservation unit 16 controls whether the start time $t_s$ has been reached.

The next operation mode of the communication capacity reservation unit 16 shown in FIG. 7 corresponds to the time period $T_{service}$.

Here, at $t_s$, the time period $T_{service}$ starts and the communication capacity is reserved to the requesting subscriber. As outlined above, in case the switching center provides a mechanism to handle calls with different priority levels, a subscriber with high priority setting up an originating or a terminating call interrupts eventually a subscriber with lower priority which will be disconnected due to congestion in the related cell.

As outlined above, this procedure may be used for the reservation by giving subscribers using the reservation service the highest priority at the requested cells within the requested time frames. In particular, to guarantee that a reservation is actually considered during the operation of the switching center 10, it is necessary to give the highest priority only to subscribers that reserve communication capacity in related cells of the mobile cellular network.

Further, during the time period $T_{service}$, there may be distinguished mechanisms for mobile originating calls, for on-going calls, and mobile terminating calls, as will be explained in the following.

For mobile station originating calls the inventive communication capacity reservation unit 16 tackles at call set-up the subscriber and related mobile station MS, the cell identity where the call set-up comes from, and whether a reservation exists. This is done by checking the data base unit 18 in the communication capacity reservation unit 16. If no reservation exists at the time, the call set-up subscriber gets a low priority. To the contrary, in case a reservation exists, the subscriber either gets a direct reservation for a communication capacity or gets assigned the highest priority, both measures leading to an equivalent result. The rest of the call set-up is handled in the same way as during normal operation with the only difference that the switching center 10 has control over the number of reservations in a cell of the cellular mobile network. In conclusion, a congestion for subscriber with reservation is avoided.

With respect to mechanisms for on-going calls, it should be avoided that a subscriber gets the highest priority in a cell in which he/she has no reservation.

Therefore, a base station sub-system BSS must inform the switching center 10 about moves to other cells with the new cell identity. However, this is only necessary for calls with reservations. Upon submission of a hand-over between different cells through the base station sub-system BSS, the same procedure as mentioned above with respect to mobile original calls starts again. If no reservation exists, the subscriber gets a lower priority or, equivalently, a communication channel assignment without reservation. This information is sent to the base station sub-system BSS which, upon receipt thereof, changes the priority of the subscriber. Here, it may happen that a call is disconnected due to other reservations in the cell.

On the other hand, to provide subscribers with a reservation while moving along a roaming path into a new cell, the base station sub-system BSS needs to inform the switching system 10 about the roaming and further about the new cell identity. Then, the check in the data base unit 18 is executed. If a reservation exists, the subscriber gets the highest or a higher priority and, otherwise, a lower priority. If the subscriber gets the highest priority, it may happen that on-going calls with lower priorities will be disconnected in the current cell.

Finally, as mechanism for mobile station terminating calls, it is checked whether a reservation for the called mobile station MS exists with respect to its current location and the related subscriber. If this is the case, the subscriber gets assigned thereto communication capacity according to this reservation. Thus, it is ensured that a communication channel to the terminating mobile station MS will always be established. As already outlined above, this may cause the disconnection of other calls with lower priority in the cell where the called mobile station is currently roaming.

The last operation mode shown in FIG. 7 relates to the time period after the end time $t_e$.

In case the subscriber is located in a cell with reservation, this reservation simply needs to be released, i.e. through releasing the priority assigned to the subscriber. Further, the reservation is deleted in the data base unit 18 and the writing of all reservation information to the subscriber's call data record starts. Here, the operator has the possibility to charge the reserved cells, the day time of reservation and the number of reserved traffic channels.

Further, the service provider has the opportunity to establish the service according to specific configurations for different cells. In particular, the service provider can specify the time between $T_{request}$ and $t_{start}$ to avoid any overloading of the data base unit 18 in the communication capacity reservation unit 16. In case the time between $T_{request}$ and $t_{start}$ is exceeded, the request will be rejected. Thus, it may be avoided that requests are processed in the communication capacity reservation unit 16 for time periods lying too far in the future, which would otherwise lead to a huge amount of data and long processing times due to this huge amount of data.

Further, the operator may specify the maximum amount of reserved communication capacity or, equivalently, the maximum number of reserved traffic channels to avoid an increased amount of disconnections for subscribers with lower priorities.

Still further, the service provider can also specify the maximum amount of reserved communication capacity per subscriber for a cell. This avoids reservations to only a single subscriber at a time. Still further, the operator can specify maximum and minimum time periods $T_{service}$ within a cell for a specific day or time. All such restrictions may be checked with the received request and only in case they are fulfilled will the inventive reservation process be initiated.

In the following, the provision of temporary wireless local-loops in cellular mobile networks will be described with respect to the GSM cellular mobile network. In particular, it will be shown how the recently introduced concept of unstructured supplementary service data USSD may be used efficiently to implement the present invention.

Generally, unstructured supplementary service data messages enable network operators to provide supplementary services as outlined above. The technical specifications for unstructured supplementary service data USSD have been specified in ETSI Technical Specification 2.90, 3.90, and 4.90 as dedicated mechanisms to exchange information between a mobile station MS and a network application running in the cellular mobile network. Unstructured supplementary service data USSD generally provide a transparent link between a mobile station MS and a node application running, e.g., in the mobile service switching center MSC of the GSM cellular mobile network. Therefore, unstructured supplementary service data USSD allow for a limited vendor-specific implementation of unstructured supplementary services.

Figure 9:
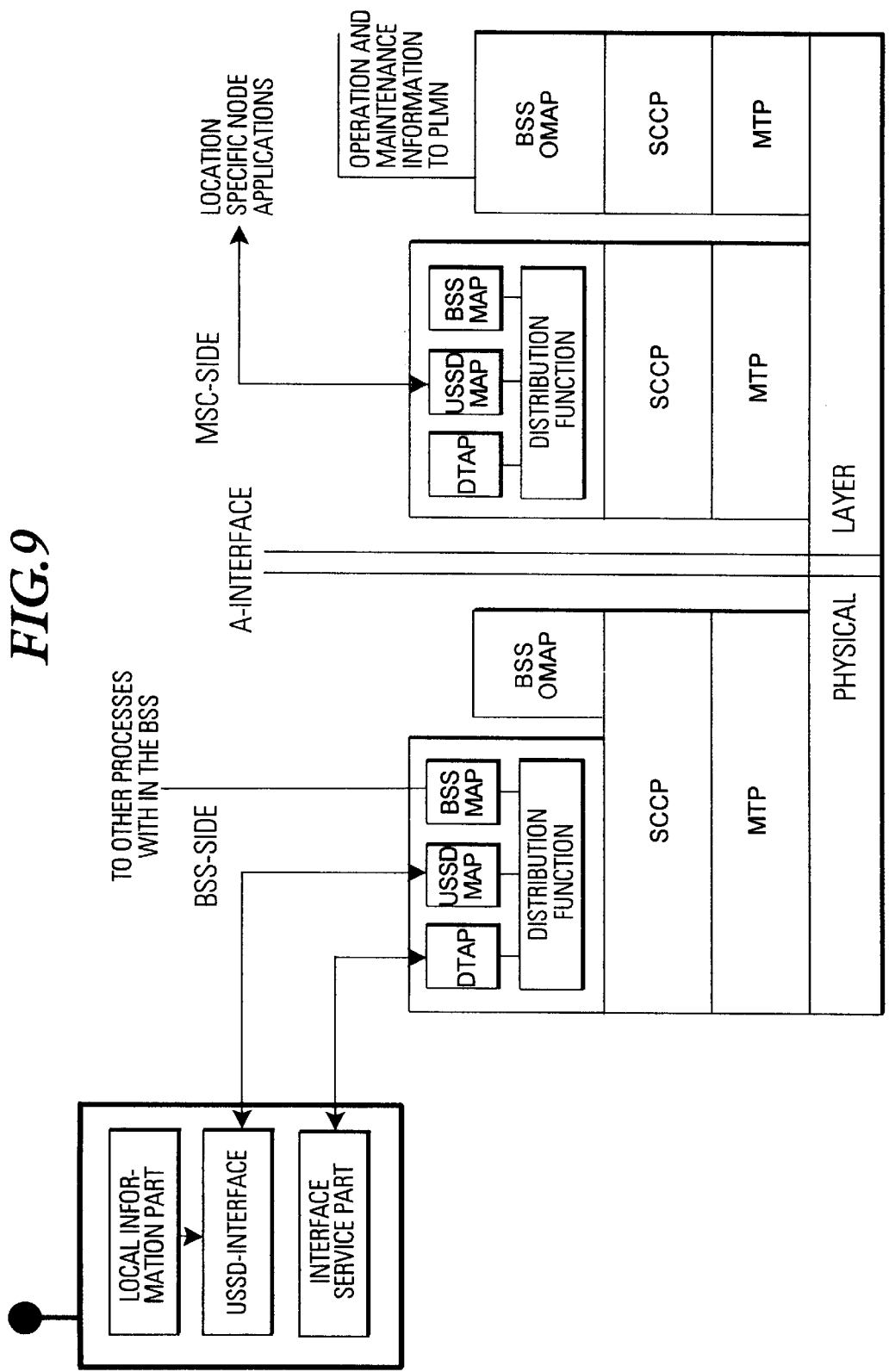
FIG. 9 shows the basic architecture underlying the exchange of unstructured supplementary service data USSD messages in a GSM mobile cellular network.

The transport mechanism underlying this embodiment of the invention is shown in FIG. 9.

As shown in FIG. 9 in the GSM cellular mobile network according to the invention, besides the usual physical transport layer on each side of an A-interface, there is also provided a message transfer part MTP and a signalling connection control part SCCP. The message transfer part MTP and the signalling connection control part SCCP are used to support communication to the mobile station MS and further contain additional conceptual entities such as the BSS operation and maintenance application part BSS OMAP and the BSS application part BSS MAP of which the first allows to transfer operation maintenance messages and the second supports all procedures that require interpretation processing of information related to single calls and resource management.

As shown in FIG. 9, in addition there is provided a direct transfer application part DTAP to transfer call control and mobility management messages between the mobile services switching center MSC and the mobile station MS. Further, an unstructured supplementary service data management application part USSD-MAP is provided for the transfer of unstructured supplementary service data and used for the transfer of information indicating reservation requests of the mobile station MS. These parts implement the different USSD-based requests and acknowledgment processes outlined above with respect to FIGS. 1 to 8.

As shown in FIG. 9, the mobile station MS contains an interface and service part to implement different basic services in the GSM mobile cellular network. In addition, to decode USSD-messages, there is provided a USSD-interface part that may be implemented as additional circuit in the mobile station MS. Another option for the implementation of the USSD-part is the provision of additional software routines in the interface and service part. This leads to the additional advantage that the location-specific services have no impact on the hardware of the mobile station MS.

Figure 10:
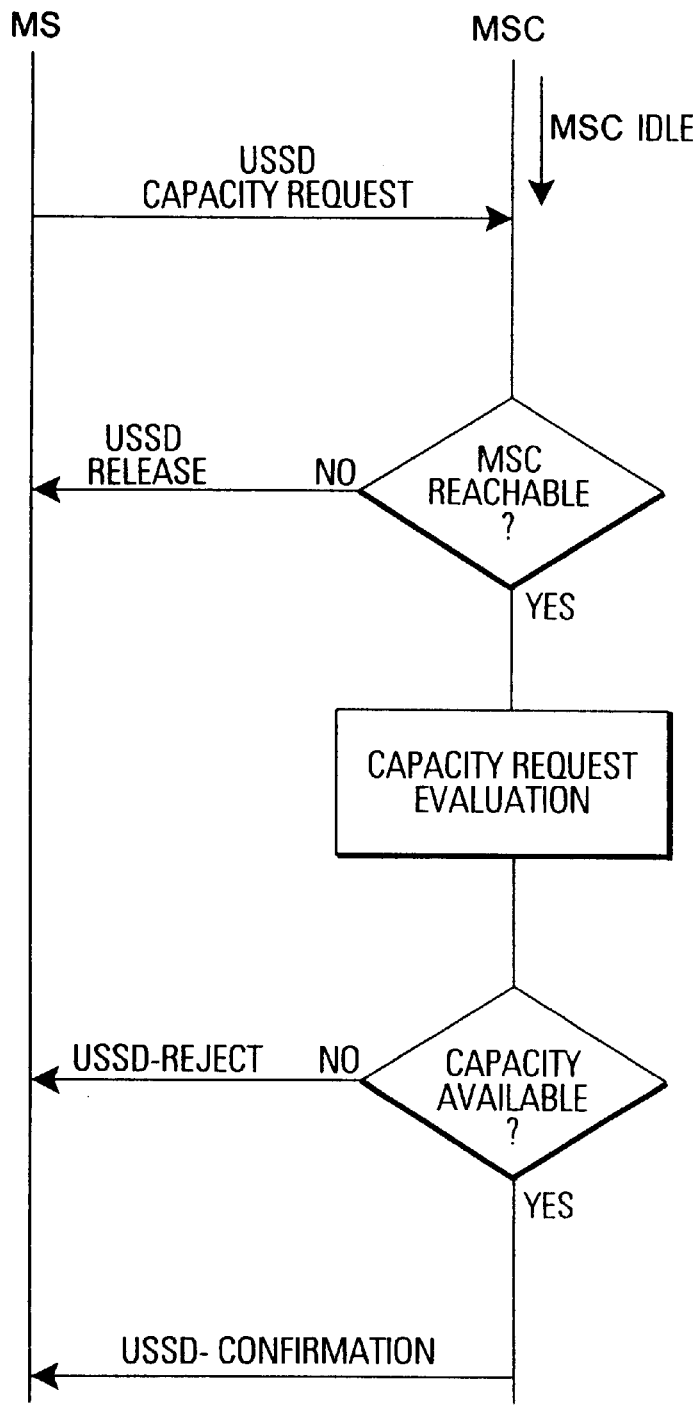
FIG. 10 shows a flowgraph according to the provision of local-loops in GSM mobile cellular network using unstructured supplementary service data USSD.

FIG. 10 shows the use of the mechanism shown in FIG. 9 for the exchange of reservation information in the sense of the embodiments described above.

Here, a USSD-based request for communication capacity is initially transferred from a mobile station MS to a mobile services switching center MSC. In case the mobile services switching center MSC is not reachable, the USSD-based request is released immediately. Otherwise, the capacity request evaluation is carried out in the sense described above, and only in case the requested communication capacity is not available, will the USSD-based request be rejected.

Otherwise, the requested communication capacity will be confirmed via a USSD-notification to the dialogue-initiating mobile station MS.

Figure 11:
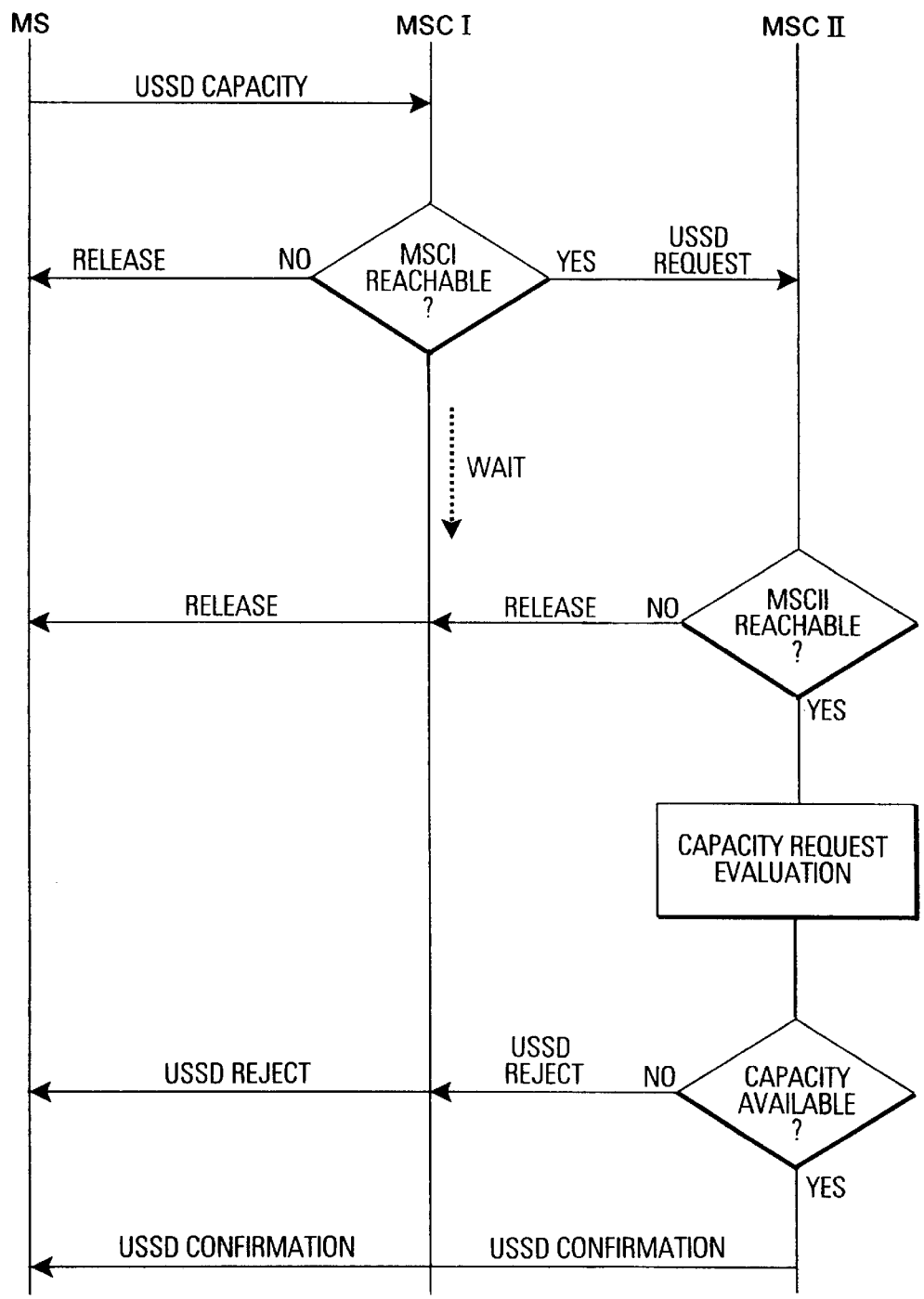
FIG. 11 shows a further flowgraph according to the provision of a local-loop in a GSM mobile cellular network using unstructured supplementary service data USSD for a case where a mobile station roams in the service area of a plurality of mobile services switching centers.
Figure 12:
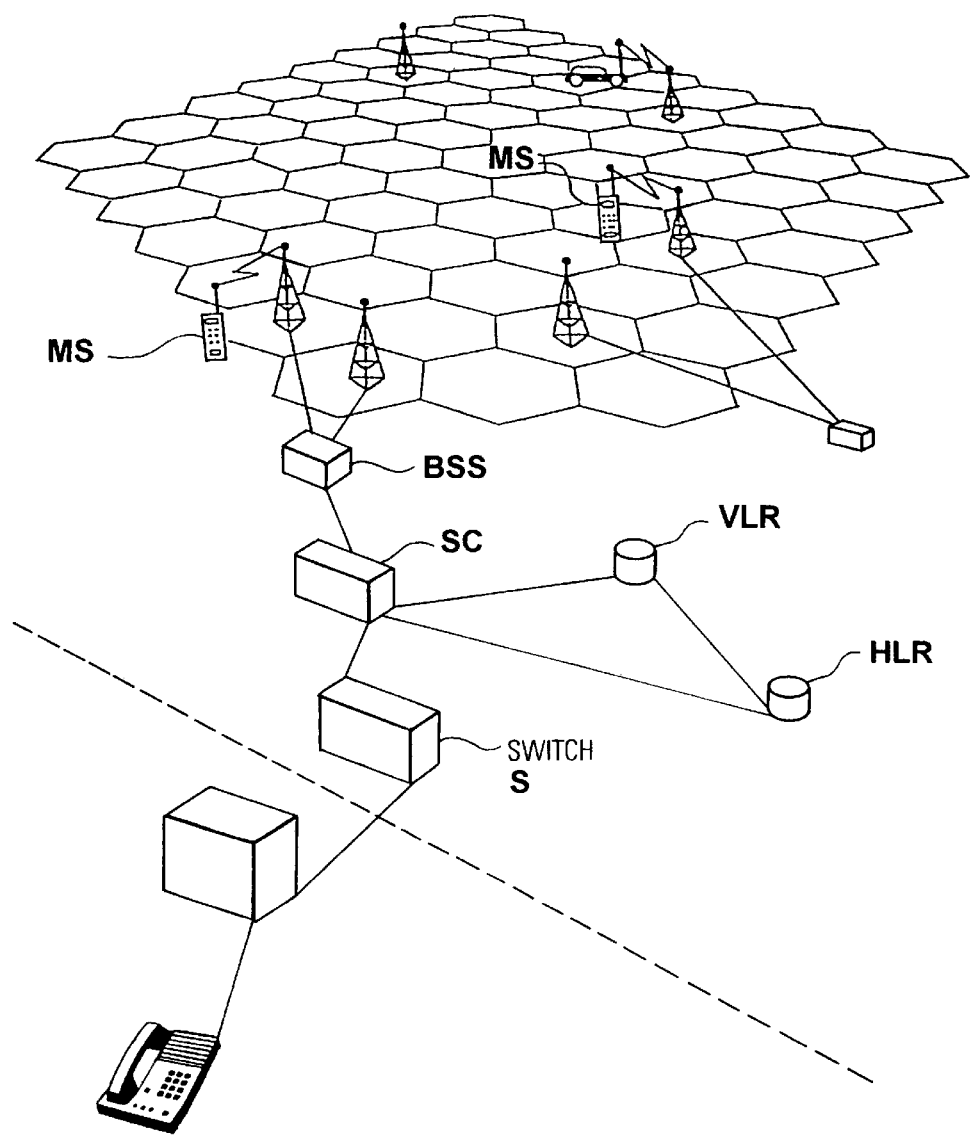
FIG. 12 shows the basic architecture of a mobile cellular network according to the background of the present invention.

FIG. 11 shows a further case being related to the mobile station roaming path P3 shown in FIG. 8, i.e. to a case where the request is received by an anchor switching center SC I and processed through a remote switching center SC II, or in other words in case the reservation process is executed via a switch.

As shown in FIG. 11, here a mobile station MS initiates a USSD-dialogue to the receiving mobile service switching center MSC I. In case this mobile services switching center MSC I is not reachable, the USSD-based request for communication capacity is immediately released.

Otherwise, a mobile services switching center MSC I forwards the request to the remote mobile services switching center MSC II which carries out the evaluation of the request for communication capacity. In case the requested communication capacity is not available, the remote mobile services switching center MSC II rejects the request for communication capacity by a USSD-notification transferred to the requesting mobile station. Otherwise, the request will be confirmed.

As can be seen from FIG. 11, the USSD-mechanism is particulary well adapted to implement the concepts of the present invention even in case the subscriber is roaming in a wide field within a single mobile cellular network or across several mobile cellular networks of different types.

However, it should be understood that the present invention is clearly not restricted to this particular type of mobile cellular network but may easily adapt it to further standards, e.g., the DCS-system, the JDC-system, the PCS 1900-system.

Still further, while different features of the present invention have been described in relation to specific embodiments of the present invention, it should be understood that each single feature according to the present invention may easily and directly be combined with each other single feature or group of features irrespective of the explanation thereof with respect to a specific embodiment.

What is claimed is:

1. A switching center for a mobile cellular network, comprising:
    interface means adapted to establish at least one communication channel between said switching center and at least one mobile station roaming in at least one cell of said mobile cellular network;
    assignment means adapted to change a communication channel assignment at said interface means upon an assignment request from a subscriber, each assignment request specifying at least a target position and a communication capacity change, respectively; and
    communication capacity reservation means adapted to reserve a specific communication capacity to at least one target position during a prespecified period of time upon receipt of a reservation request.

2. The switching center according to claim 1, wherein said communication capacity reservation means is further adapted to activate said assignment means at the beginning of said prespecified period of time in accordance with said reservation request.

3. The switching center according to claim 2, wherein said communication capacity reservation means is further adapted to drop established communication channels due to an activation of said assignment means at said beginning of said prespecified period of time in accordance with said reservation request.

4. The switching center according to claim 3, wherein said communication capacity reservation means is further adapted to issue an announcement before dropping an established communication channel.

5. A switching center for a mobile cellular network, comprising:
    interface means adapted to establish at least one communication channel between said switching center and at least one mobile station roaming in at least one cell of said mobile cellular network;
    assignment means adapted to change a communication channel assignment at said interface means upon an assignment request from a subscriber, each assignment specifying at least a target position and a communication capacity change, respectively, and
    communication capacity reservation means adapted to reserve a specific communication capacity to at least one target position during a prespecified period of time upon receipt of a reservation request; wherein
        said communication capacity reservation means comprises a data base means adapted to store at least said reserved communication channel capacity, said communication channel target positions, and said prespecified period of time of each reservation request.

6. The switching center according to claim 5, wherein said data base means further stores a priority value being a measure of probability that said assignment means is activated at the beginning of said prespecified period of time in accordance with said reservation request.

7. The switching center according to claim 5, wherein said communication capacity reservation means is further adapted to activate said assignment means at the beginning of said prespecified period of time in accordance with said reservation request.

8. The switching center according to claim 7, wherein said communication capacity reservation means is further adapted to drop established communication channels due to an activation of said assignment means at said beginning of said prespecified period of time in accordance with said reservation request.

9. The switching center according to claim 8, wherein said communication capacity reservation means is further adapted to issue an announcement before dropping an established communication channel.

10. A switching center for a mobile cellular network, comprising:
    interface means adapted to establish at least one communication channel between said switching center and at least one mobile station roaming in at least one cell of said mobile cellular network;
    assignment means adapted to change a communication channel assignment at said interface means upon an assignment request from a subscriber, each assignment request specifying at least a target position and a communication capacity change, respectively, and
    communication capacity reservation means adapted to reserve a specific communication capacity to at least one target position during a prespecified period of time upon receipt of a reservation request; wherein
        said communication capacity reservation means further comprises a request checking means adapted to check on the admissibility of a request submitted to said switching center in accordance with cell positions covered by said switching center and being affected by said request and also in accordance with a capacity assignment profile of said affected cell positions.

11. The switching center according to claim 10, wherein said request checking means rejects a request in case a maximum acceptance time is exceeded.

12. The switching center according to claim 11, wherein said request checking means rejects a request in case an authorization may not be validated.

13. A switching center for a mobile cellular network, comprising:
    interface means adapted to establish at least one communication channel between said switching center and at least one mobile station roaming in at least one cell of said mobile cellular network;
    assignment means adapted to change a communication channel assignment at said interface means upon an assignment request from a subscriber, each assignment request specifying at least a target position and a communication capacity change, respectively; and
    communication capacity reservation means adapted to reserve a specific communication capacity to at least one target position during a prespecified period of time upon receipt of a reservation request; wherein
        said communication capacity reservation means further comprises location mapping means adapted to map a geographical information specified in said reservation request into the at least one target position.

14. The switching center according to claim 13, wherein said location mapping means is also adapted to derive the at least one target position from routing information specified in said reservation request.

15. A switching center for a mobile cellular network, comprising:

interface means adapted to establish at least one communication channel between said switching center and at least one mobile station roaming in at least one cell of said mobile cellular network;

assignment means adapted to change a communication channel assignment at said interface means upon an assignment request from a subscriber, each assignment request specifying at least a target position and a communication capacity change, respectively; and communication capacity reservation means adapted to reserve a specific communication capacity to at least one target position during a prespecified period of time upon receipt of a reservation request; wherein said switching center is the mobile services switching center (MSC) of a GSM cellular mobile network and that the requests are received via unstructured supplementary service data dialogue messages (USSD).

16. A method to reserve communication capacity between at least one switching center in cellular mobile network and a mobile station roaming in said cellular mobile network, said method comprising the steps of:

receiving at said switching center a request, from a subscriber using said mobile station (MS), for communication capacity;

deriving cells covered by said switching center and being affected through said received request;

determining a match between a communication capacity assignment profile and said requested communication capacity for all affected cells; and reserving a communication channel according to said requested communication capacity between said switching center and said mobile station (MS) at a start time prespecified in said request for communication capacity.

17. The method according to claim 16, wherein said step of determining further comprises the step of checking if there exists communication capacity reservation within the time frame defined through said start time and an end time of said received request for communication capacity, respectively.

18. A method to reserve communication capacity between at least one switching center in cellular mobile network and a mobile station roaming in said cellular mobile network, said method comprising the steps of:

receiving from said switching center a request, from a subscriber using said mobile station (MS), for communication capacity;

deriving cells covered by said switching center and being affected through said received request;

determining a match between a communication capacity assignment profile and said requested communication capacity for all affected cells; and reserving a communication channel according to said requested communication capacity between said switching center and said mobile station (MS) at a start time prespecified in said request for communication capacity; wherein said cells being affected through said received request are automatically derived on the basis of mobility information defined in said received request.

19. A method to reserve communication capacity between at least one switching center in cellular mobile network and a mobile station roaming in said cellular mobile network, said method comprising the steps of:

receiving at said switching center a request, from a subscriber using said mobile station (MS), for communication capacity;

deriving cells covered by said switching center and being affected through said received request;

determining a match between a communication capacity assignment profile and said requested communication capacity for all affected cells;

reserving a communication channel according to said requested communication capacity between said switching center and said mobile station (MS) at a start time prespecified in said request for communication capacity; and dropping established communication channels due to said request for communication capacity.

20. The method according to claim 19, further comprising the step of announcing said reservation for communication capacity.

* * * * *